(12) United States Patent
Lee

(10) Patent No.: US 11,597,344 B2
(45) Date of Patent: Mar. 7, 2023

(54) CURTAIN AIRBAG

(71) Applicant: HYUNDAI MOBIS CO., LTD., Seoul (KR)

(72) Inventor: Jong Seob Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/367,256

(22) Filed: Jul. 2, 2021

(65) Prior Publication Data

US 2022/0340097 A1  Oct. 27, 2022

(30) Foreign Application Priority Data

Apr. 27, 2021 (KR) .......................... 10-2021-0054307

(51) Int. Cl.
*B60R 21/232* (2011.01)
*B60R 21/233* (2006.01)
*B60R 21/2346* (2011.01)

(52) U.S. Cl.
CPC .......... *B60R 21/232* (2013.01); *B60R 21/233* (2013.01); *B60R 21/2346* (2013.01); *B60R 2021/23316* (2013.01)

(58) Field of Classification Search
CPC ... B60R 21/213; B60R 21/232; B60R 21/233; B60R 21/2346; B60R 21/237; B60R 21/261; B60R 21/262; B60R 2021/161; B60R 2021/23308; B60R 2021/23316; B60R 2021/2612; B60R 2021/2617
See application file for complete search history.

(56) References Cited

U.S. PATENT DOCUMENTS

| | | | | |
|---|---|---|---|---|
| 6,338,498 | B1* | 1/2002 | Niederman | B60R 21/232 280/730.2 |
| 6,457,740 | B1* | 10/2002 | Vaidyaraman | B60R 21/232 280/730.2 |
| 6,830,262 | B2* | 12/2004 | Sonnenberg | B60R 21/232 280/730.2 |
| 7,055,852 | B2* | 6/2006 | Bakhsh | B60R 21/235 280/743.1 |
| 7,077,425 | B2* | 7/2006 | Ogawa | B60R 21/213 280/730.2 |

(Continued)

FOREIGN PATENT DOCUMENTS

| | | | |
|---|---|---|---|
| JP | 2009286300 A | * 12/2009 | ........... B60R 21/232 |
| JP | 2013049392 A | * 3/2013 | |

(Continued)

*Primary Examiner* — Laura Freedman
(74) *Attorney, Agent, or Firm* — DLA Piper LLP

(57) ABSTRACT

A curtain airbag is proposed to improve the deployability of an airbag cushion while simplifying the structure of the curtain airbag by forming a sub-chamber. The curtain airbag includes a main chamber of an airbag cushion secured to an upper end inside a vehicle body to be deployed to a lower end thereof, a first sub-chamber of the airbag cushion deployed above a pillar trim while pushing the vehicle body to move the main chamber towards a center of a vehicle, and a second sub-chamber of the airbag cushion deployed between an end of the pillar trim and the main chamber, thus pushing the main chamber to prevent the main chamber from being caught by the end of the pillar trim.

11 Claims, 10 Drawing Sheets

(56) References Cited

U.S. PATENT DOCUMENTS

| | | | | |
|---|---|---|---|---|
| 7,163,232 B2 * | 1/2007 | Yokoyama | ............ | B60R 21/201 280/730.2 |
| 7,264,267 B2 * | 9/2007 | Kino | ................ | B60R 21/2338 280/730.2 |
| 7,390,016 B2 * | 6/2008 | Noguchi | ............... | B60R 21/232 280/730.2 |
| 7,967,332 B2 * | 6/2011 | Karlsson | ............... | B60R 21/232 280/730.2 |
| 8,020,888 B2 * | 9/2011 | Cheal | ................ | B60R 21/233 280/730.2 |
| 8,414,014 B2 * | 4/2013 | Nogami | ............... | B60R 21/2338 280/730.2 |
| 8,414,021 B2 * | 4/2013 | Tanaka | ................ | B60R 21/2334 280/730.2 |
| 8,585,080 B2 * | 11/2013 | Trevena | ................ | B60R 21/213 280/730.2 |
| 8,801,030 B2 * | 8/2014 | Sugimori | ............... | B60R 21/232 280/730.2 |
| 9,016,717 B1 * | 4/2015 | Clauser | ............... | B60R 21/2338 280/729 |
| 9,126,558 B2 * | 9/2015 | Kawamura | ............ | B60R 21/213 |
| 9,415,742 B1 * | 8/2016 | Sasakura | ............. | B60R 21/2346 |
| 9,440,610 B2 * | 9/2016 | Lee | ........................ | B60R 21/232 |
| 9,963,102 B1 * | 5/2018 | Ballam | ................. | B60R 21/237 |
| 10,214,173 B2 * | 2/2019 | Asada | .................... | B60R 21/213 |
| 11,254,279 B2 * | 2/2022 | Lee | .................... | B60R 21/213 |
| 2021/0061214 A1 * | 3/2021 | Kim | ..................... | B60R 21/237 |

FOREIGN PATENT DOCUMENTS

| | | | |
|---|---|---|---|
| JP | 2013049393 A | * | 3/2013 |
| JP | 2016117466 A | * | 6/2016 |
| KR | 10-0942220 | | 2/2010 |

* cited by examiner

CURTAIN AIRBAG

CROSS REFERENCE TO RELATED APPLICATION

The present application claims priority to Korean Patent Application No. 10-2021-0054307, filed Apr. 27, 2021, the entire contents of which are incorporated herein for all purposes by this reference.

BACKGROUND OF THE INVENTION

Field of the Invention

The present invention relates to a curtain airbag, intended to improve the deployability of an airbag cushion while simplifying the structure of the curtain airbag by forming a sub-chamber.

Description of the Related Art

An airbag cushion of an airbag is normally folded in an airbag housing. If a sensor detects a collision signal in the event of a vehicle collision, gas is supplied through an inflator to the airbag cushion to instantly deploy the airbag cushion, thereby protecting a passenger from an impact to the vehicle.

Recently, in addition to an airbag present in front of each of a driver's seat and a passenger seat and a side airbag deployed from a side of the seat to prepare for a side collision, a curtain airbag deployed along a window is widely spread.

Meanwhile, the curtain airbag is configured such that the airbag cushion is provided along front and rear rows, and an inflator is installed to supply gas to the interior of the airbag cushion.

Moreover, as shown in FIG. 1, mounting tabs 9 are secured to predetermined portions in a longitudinal direction of the airbag cushion 7. Each mounting tab 9 is secured to a vehicle body 1, thus fixing the airbag cushion 7 to the vehicle body 1.

Further, an upper end of a ramp 5 is secured to an inner surface of the vehicle body 1 corresponding to a pillar trim 3 of a B pillar and a C pillar of the vehicle, and a lower end of the ramp 5 is formed to surround a lower end of the airbag cushion 7. Thus, when the airbag cushion 7 is deployed, the airbag cushion 7 is guided to an inboard side of the pillar trim 3 by the ramp 5 and is deployed while avoiding the pillar trim 3. Consequently, the deployability of the airbag cushion 7 is improved.

As such, the conventional curtain airbag is problematic in that the ramp is added so as to deploy the airbag cushion while avoiding the pillar trim, thus increasing cost and the number of assembling processes due to the application of the ramp.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an objective of the present invention is to provide a curtain airbag intended to improve the deployability of an airbag cushion while simplifying the structure of the curtain airbag by forming a sub-chamber.

In order to achieve the objective of the present invention, the present invention provides a curtain airbag, including a main chamber of an airbag cushion secured to an upper end inside a vehicle body to be deployed to a lower end thereof; a first sub-chamber of the airbag cushion deployed above a pillar trim while pushing the vehicle body to move the main chamber towards a center of a vehicle; and a second sub-chamber of the airbag cushion deployed between an end of the pillar trim and the main chamber, thus pushing the main chamber to prevent the main chamber from being caught by the end of the pillar trim.

The first sub-chamber and the second sub-chamber may be deployed prior to the main chamber.

A diffuser may be secured to an interior of the airbag cushion, an inflator may be connected to an inlet of the diffuser to introduce gas therein, and an outlet of the diffuser may be formed in each of the main chamber, the first sub-chamber, and the second sub-chamber to diffuse the gas introduced into the diffuser into each chamber.

The inlet of the diffuser may be connected to a first sub-outlet formed in the first sub-chamber and a first main-outlet formed in the main chamber to diffuse gas thereto, and the first main-outlet may be connected to a second sub-outlet formed in the second sub-chamber and a second main-outlet formed in the main chamber to diffuse the gas thereto.

The first sub-chamber may be formed in a longitudinal direction of the main chamber, and may have a shape of a passage where the inflator is connected to a first end of the first sub-chamber and a second end thereof is closed, and a middle portion of the first sub-chamber may be formed to communicate with an edge of the main chamber. The second sub-chamber may be formed in the longitudinal direction of the main chamber, and may have a shape of a passage where a first end of the second sub-chamber communicates with the edge of the main chamber and a second end thereof is closed.

A peninsula region of a predetermined area which is not filled with gas may be formed in at least any one between the second end of the first sub-chamber and the main chamber facing the second end, and between the second end of the second sub-chamber and the main chamber facing the second end, a peninsula region around the first sub-chamber may be formed such that edges thereof excluding one side are surrounded by an edge of the first sub-chamber and the edge of the main chamber, and a peninsula region around the second sub-chamber may be formed such that edges thereof excluding one side are surrounded by an edge of the second sub-chamber and the edge of the main chamber.

A first end of the mounting tab may be secured to the vehicle body, and a second end of the mounting tab may be secured between the main chamber and the first sub-chamber, and between the main chamber and the second sub-chamber.

The main chamber may be folded in a roll shape, and the second sub-chamber may be folded over the main chamber to surround a lower end of the main chamber.

A folding portion on an end of the second sub-chamber may be inwardly folded towards the main chamber.

A folding portion on an end of the second sub-chamber may be outwardly folded towards the center of the vehicle.

The main chamber may be folded in a roll shape, and the first sub-chamber may be folded between the mounting tab and the vehicle body.

A folding portion on an end of the first sub-chamber may be inwardly folded towards the mounting tab.

A folding portion on an end of the first sub-chamber may be outwardly folded towards the vehicle body.

According to an embodiment of the present invention, the deployability of an airbag cushion is improved through a first sub-chamber and a second sub-chamber, and an existing ramp structure is not required to deploy an airbag cushion while avoiding a pillar trim, thus reducing the cost of a curtain airbag module, and preventing the number of work processes for assembling a ramp from increasing.

BRIEF DESCRIPTION OF THE DRAWINGS

The above and other objectives, features, and other advantages of the present invention will be more clearly understood from the following detailed description when taken in conjoint with the accompanying drawings, in which.

DETAILED DESCRIPTION OF THE INVENTION

Figure 1:
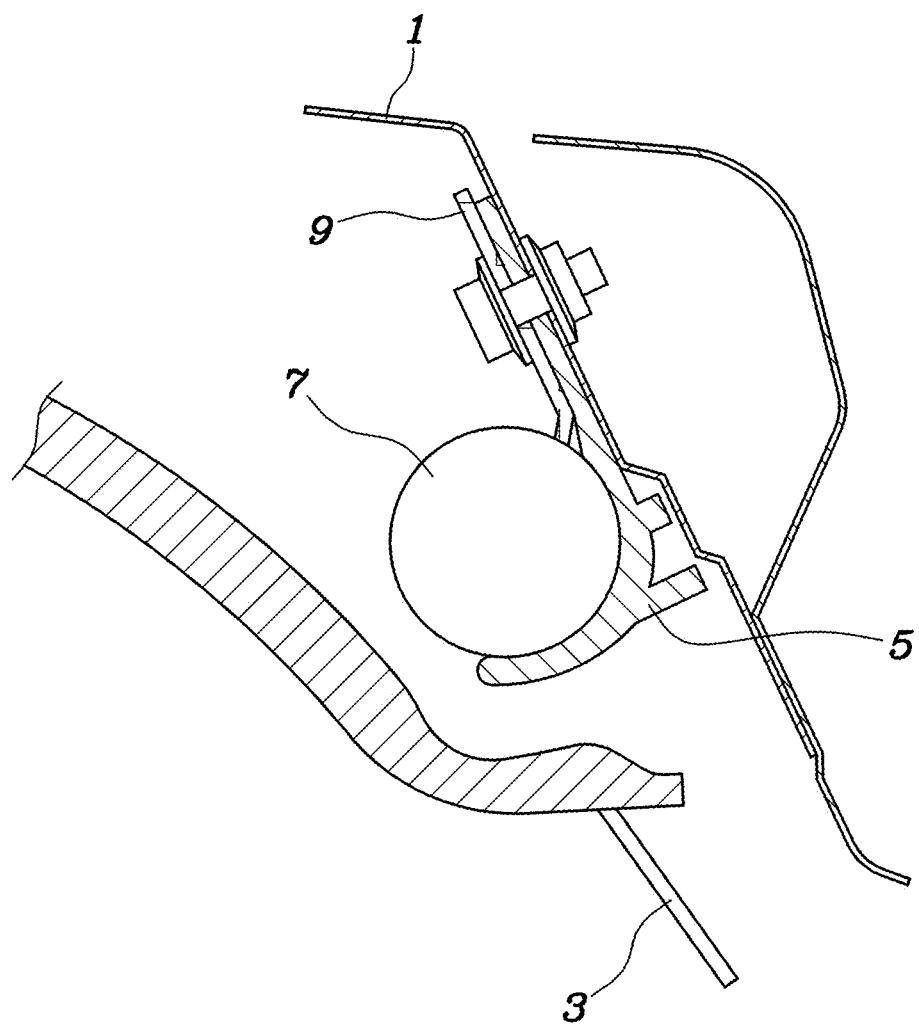
FIG. 1 is a diagram illustrating a curtain airbag structure equipped with an existing ramp.

Specific structural or functional descriptions in the embodiments of the present invention disclosed in this specification or application are only for description of the embodiments of the present invention. The descriptions should not be construed as being limited to the embodiments described in the specification or application.

Since the present invention may be embodied in many different forms, particular embodiments will be illustrated in the drawings and be described in detail herein. However, it is to be understood that the present description is not intended to limit the present invention to those exemplary embodiments, and the present invention is intended to cover not only the exemplary embodiments, but also various alternatives, modifications, equivalents and other embodiments that fall within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or directly adjacent to" should be construed in the same way.

The terminology used herein is for the purpose of describing particular embodiments only and is not intended to be limiting. In the present invention, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, preferred embodiment of the present invention will be described in detail with reference to the accompanying drawings.

A curtain airbag according to the present invention is configured such that an airbag cushion 100 of the curtain airbag is provided in a rolled shape along front and rear rows on an upper end inside a vehicle door.

Moreover, lower ends of mounting tabs 150 made of fabric (e.g. cotton) material are secured to predetermined portions in a longitudinal direction of the airbag cushion 100, and upper ends of the mounting tabs 150 are secured to a vehicle body 300, thus securing the airbag cushion 100 to the vehicle body 300.

In this regard, the mounting tabs 150 may be sewn onto the airbag cushion 100, or may be formed integrally with the airbag cushion 100.

Furthermore, an inflator 200 is installed in the middle of the airbag cushion 100 in the entire length of the airbag cushion 100, and the inflator 200 is connected to a diffuser 160 of the airbag cushion 100, thus allowing gas discharged from the inflator 200 to flow through the diffuser 160 into the airbag cushion 100.

Figure 2:
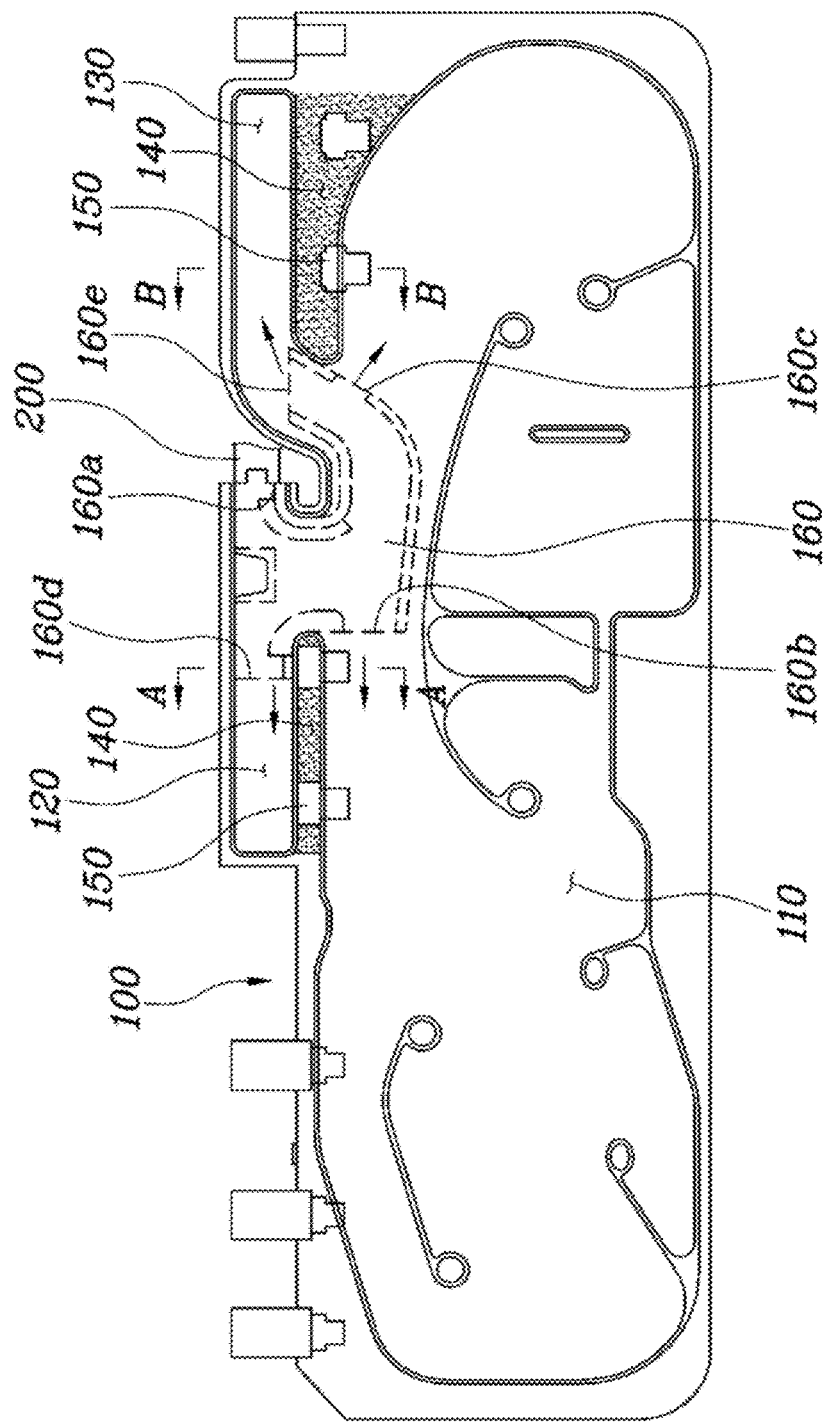
FIG. 2 is a diagram illustrating a state in which an airbag cushion according to the present invention is deployed.

Meanwhile, FIG. 2 is a diagram illustrating a state in which the airbag cushion 100 according to the present invention is deployed.

Referring to the drawing, the curtain airbag includes a main chamber 110, a first sub-chamber 120, and a second sub-chamber 130. The main chamber 110 of the airbag cushion 100 is secured to an upper end inside the vehicle body 300 to be deployed to a lower end thereof. The first sub-chamber 120 of the airbag cushion 100 is deployed above a pillar trim 400 while pushing the vehicle body 300 to move the main chamber 110 towards the center of the vehicle. The second sub-chamber 130 of the airbag cushion 100 is deployed between an end of the pillar trim 400 and the main chamber 110 and pushes the main chamber 110 to prevent the main chamber 110 from being caught by the end of the pillar trim 400.

In particular, the first sub-chamber 120 and the second sub-chamber 130 are deployed prior to the main chamber 110.

Preferably, the first sub-chamber 120 may be first deployed compared to other chambers, and the second sub-chamber 130 may be deployed after the first sub-chamber 120 is deployed. However, the first sub-chamber 120 and the second sub-chamber 130 may be simultaneously deployed by changing the shape and structure of the first sub-chamber 120 and the second sub-chamber 130.

For example, the pillar trim 400 may be the pillar trim 400 that extends in a vertical direction inside the B pillar and the C pillar. The first sub-chamber 120 may be located in a portion of the pillar trim 400 of the B pillar or the C pillar, while the second sub-chamber 130 may be located in a portion of the pillar trim 400 of the B pillar or the C pillar where the first sub-chamber 120 is not located. Herein, an example where the first sub-chamber 120 is located in a portion of the pillar trim 400 of the B pillar and the second sub-chamber 130 is located in a portion of the pillar trim 400 of the C pillar is described.

Figure 3:
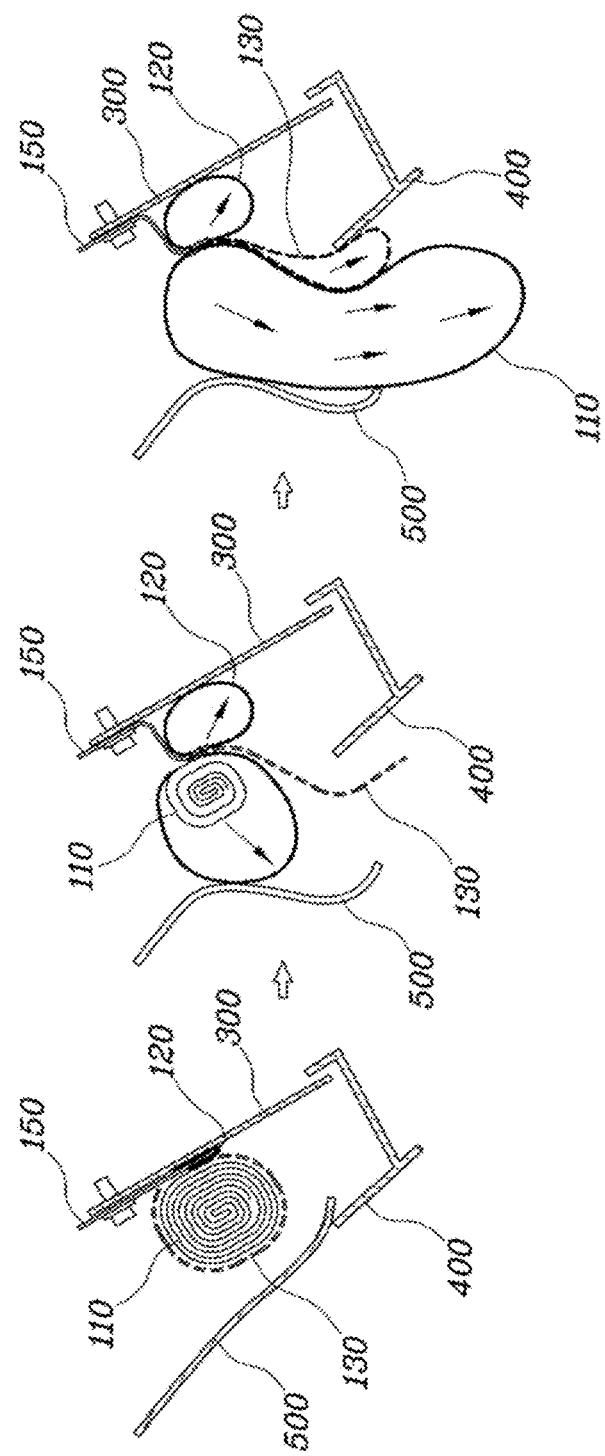
FIG. 3 is a diagram illustrating a cushion deployment process in a line A-A of FIG. 2.

In other words, as shown in FIGS. 2 and 3, when the airbag cushion 100 is deployed, gas is injected into the first sub-chamber 120, so that the first sub-chamber 120 is inflated above the pillar trim 400 of the B pillar while forming a predetermined volume. Thus, the first sub-chamber 120 rapidly pushes the airbag cushion 100 from the inner surface of the vehicle body 300 towards the center of the vehicle.

Figure 7:
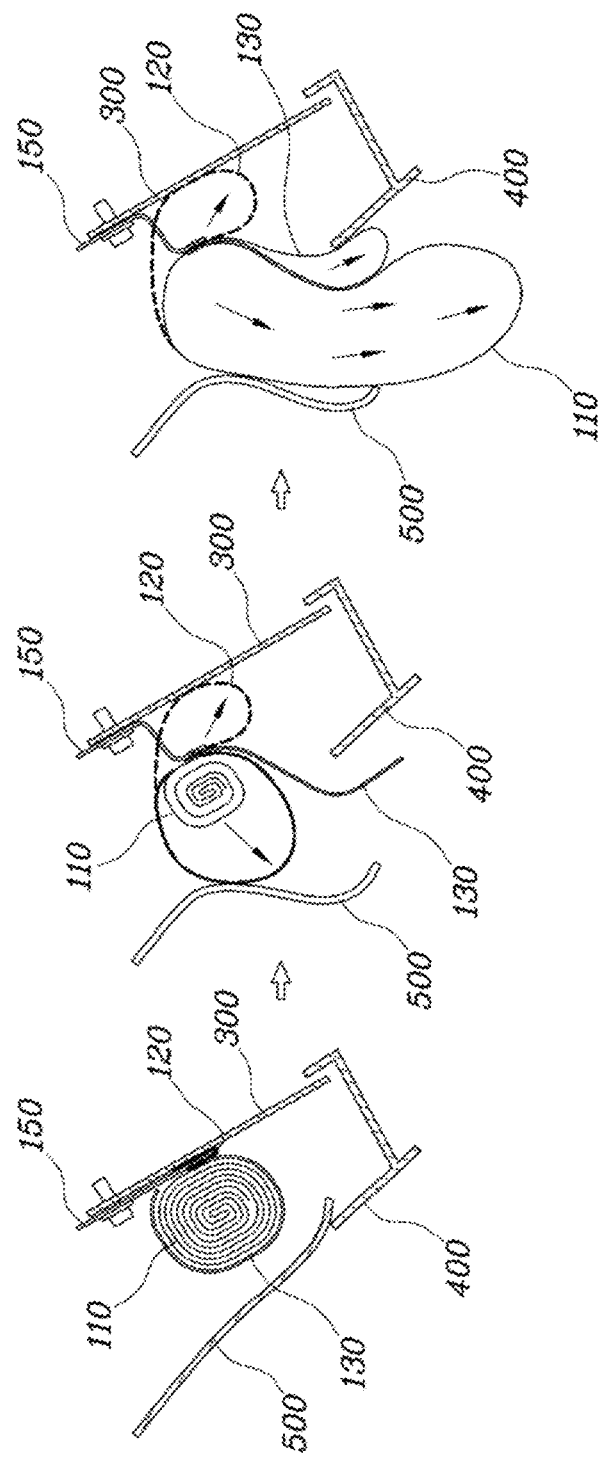
FIG. 7 is a diagram illustrating a cushion deployment process in a line B-B of FIG. 2.

Moreover, as shown in FIGS. 2 and 7, gas is injected into the main chamber 110 and the second sub-chamber 130 to deploy the main chamber 110 and the second sub-chamber 130. The second sub-chamber 130 is deployed between the end of the pillar trim 400 of the C pillar and the main chamber 110, thus causing the main chamber 110 to be deployed downwards without interfering with the pillar trim 400 of the C pillar.

Therefore, the deployability of the airbag cushion 100 is improved, and especially, an existing ramp structure is not required to deploy the airbag cushion 100 while avoiding the pillar trim 400, thus reducing the cost of the curtain airbag module, and preventing the number of work processes for assembling the ramp from increasing.

However, such a deployment of the airbag cushion is just an example of preferred deployments. Even if the first sub-chamber 120 is not deployed, the function of deploying the main chamber 110 downwards without interfering with the pillar trim 400 may be implemented by deploying only the second sub-chamber 130.

In addition, according to the present invention, the shape of the diffuser 160 may be controlled to deploy the first sub-chamber 120 and the second sub-chamber 130 prior to the main chamber 110.

Referring to FIG. 2, according to the present invention, the diffuser 160 is secured to the interior of the airbag cushion 100, the inflator 200 is connected to an inlet 160a of the diffuser 160 to introduce gas therein, and an outlet of the diffuser 160 is formed in each of the main chamber 110, the first sub-chamber 120, and the second sub-chamber 130 to diffuse the gas introduced into the diffuser 160 into each chamber.

For example, the diffuser 160 is sewn onto the interior of the airbag cushion 100. If gas is introduced through the inflator 200, the diffuser serves to diffuse the introduced gas to each chamber in the airbag cushion 100.

To this end, the diffuser 160 includes the inlet 160a connected to the inflator 200 to introduce gas, and a plurality of outlets formed to discharge gas into the main chamber 110 and the first and second sub-chambers.

To be more specific, the inlet 160a of the diffuser 160 is connected to a first sub-outlet 160d formed in the first sub-chamber 120 and a first main-outlet 160b formed in the main chamber 110 to diffuse the gas thereto, and the first main-outlet 160b is connected to a second sub-outlet 160e formed in the second sub-chamber 130 and a second main-outlet 160c formed in the main chamber 110 to diffuse the gas thereto.

For example, the inlet 160a and the first sub-outlet 160d of the diffuser 160 are formed in the first sub-chamber 120 to face each other, a portion is vertically formed between the inlet 160a of the diffuser 160 and the first sub-outlet 160d to extend towards the main chamber 110, and the first main-outlet 160b is formed on one side of the vertically formed portion to face the front end of the main chamber 110.

Moreover, the other side of the vertically formed portion extends, so that the second main-outlet 160c and the second sub-outlet 160e branch from an end of the extending portion towards the rear end of the main chamber 110 and the second sub-chamber 130.

Through such a configuration, when the gas of the inflator 200 is introduced into the inlet 160a of the diffuser 160, the gas introduced into the inlet 160a of the diffuser 160 is diffused to the first main-outlet 160b on the front end of the diffuser 160 and the first sub-outlet 160d, so that the gas is introduced to the first sub-chamber 120 and the front end of the main chamber 110.

Moreover, a portion of the gas diffused towards the first main-outlet 160b is diffused to the second main-outlet 160c on the rear end of the diffuser 160 and the second sub-outlet 160e, so that the gas is introduced into the second sub-chamber 130 and the rear end of the main chamber 110.

Therefore, the gas introduced into the diffuser 160 is supplied to each chamber, and the inlet 160a of the diffuser 160 is disposed to face the first sub-outlet 160d, so that the first sub-chamber 120 may be first deployed.

Although gas is diffused through the second main-outlet 160c and the second sub-outlet 160e, the second sub-chamber 130 is smaller in volume than the main chamber 110, so that the second sub-chamber 130 is inflated and deployed more rapidly than the main chamber 110, and thereby the first sub-chamber 120 and the second sub-chamber 130 may be deployed more rapidly than the main chamber 110.

Figure 4:
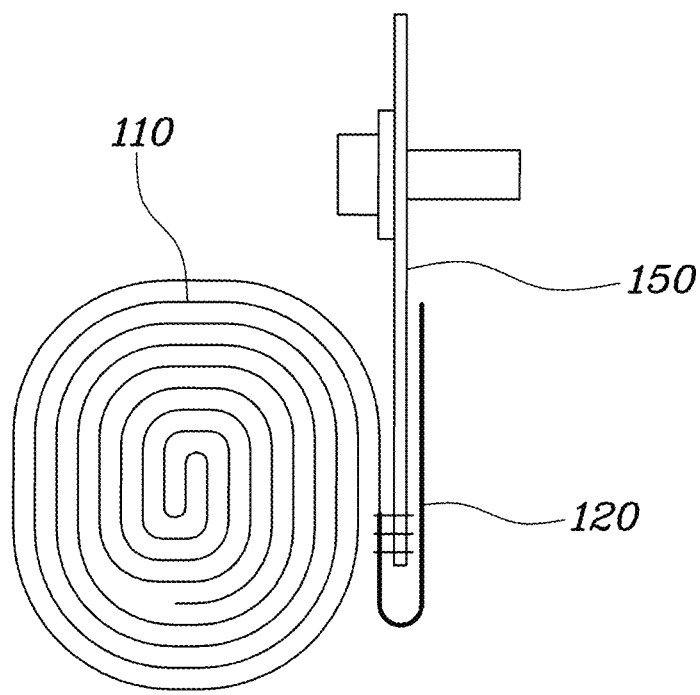
FIGS. 4 to 6 are diagrams illustrating folding embodiments of a first sub-chamber according to the present invention.
Figure 8:
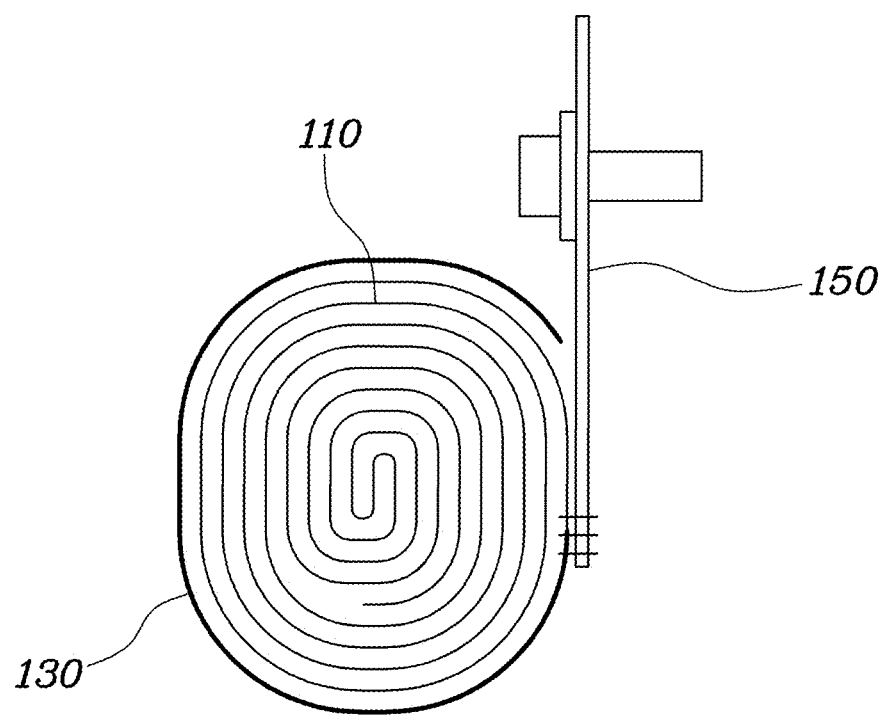
FIGS. 8 to 10 are diagrams illustrating folding embodiments of a second sub-chamber according to the present invention.

Referring to FIGS. 2, 4, and 8, the structure of the first sub-chamber 120 and the second sub-chamber 130 will be described in detail. First, the first sub-chamber 120 is formed in the longitudinal direction of the main chamber 110, and has the shape of a passage where the inflator 200 is connected to one end of the first sub-chamber and the other end thereof is closed, and a middle portion of the first sub-chamber is formed to communicate with an edge of the main chamber 110.

Moreover, the second sub-chamber 130 is formed in the longitudinal direction of the main chamber 110, and is configured in the shape of the passage where one end thereof communicates with the edge of the main chamber 110 and the other end thereof is closed.

In other words, the first sub-chamber 120 is provided on a central portion of the upper end of the main chamber 110, is deployed in the shape of the passage in the longitudinal direction of the airbag cushion 100, and pushes the main chamber 110 and the second sub-chamber 130 towards a head lining 500 when the first sub-chamber 120 is deployed.

Furthermore, a middle portion of the first sub-chamber 120 communicates through the diffuser 160 with the main chamber 110, so that gas introduced into the first sub-chamber 120 is fed into the main chamber 110.

In addition, the second sub-chamber 130 is provided on a side of the upper end of the main chamber 110 and deployed in in the shape of the passage in the longitudinal direction of the airbag cushion 100. When the second sub-chamber 130 is deployed, the second sub-chamber 130 pushes the main chamber 110 towards the head lining 500 while being deployed between the end of the pillar trim 400 and the main chamber 110.

Furthermore, the second sub-chamber 130 communicates through the diffuser 160 with the main chamber 110, so that the gas introduced into the main chamber 110 is fed into the second sub-chamber 130.

Further, as shown in FIG. 2, according to the present invention, a peninsula region 140 of a predetermined area which is not filled with gas is formed in at least any one between the other end of the first sub-chamber 120 and the main chamber 110 facing the other end, and between the other end of the second sub-chamber 130 and the main chamber 110 facing the other end.

Moreover, the peninsula region 140 around the first sub-chamber 120 may be formed such that edges thereof excluding one side are surrounded by the edge of the first sub-chamber 120 and the edge of the main chamber 110, and the peninsula region 140 around the second sub-chamber 130 may be formed such that edges thereof excluding one side are surrounded by the edge of the second sub-chamber 130 and the edge of the main chamber 110.

In other words, the peninsula region 140 may be formed in a portion for separating the main chamber 110 and the first sub-chamber 120 from each other, and may be formed in a portion for separating the main chamber 110 and the second sub-chamber 130 from each other. By adjusting the area of the peninsula region 140, it is possible to adjust the sectional area of the first sub-chamber 120 and/or the second sub-chamber 130, and thereby to adjust the flow rate of gas introduced into a corresponding chamber 120 or 130.

In addition, one end of the mounting tab 150 may be secured to the vehicle body 300, and the other end of the mounting tab 150 may be secured between the main chamber 110 and the first sub-chamber 120 and between the main chamber 110 and the second sub-chamber 130.

For example, the lower end of the mounting tab 150 may be secured to the peninsula region 140 formed between the main chamber 110 and the first sub-chamber 120, and may be secured to the peninsula region 140 formed between the main chamber 110 and the second sub-chamber 130. Since it is possible to adjust the area of the peninsula region 140 and simultaneously adjust the position of securing the lower end of the mounting tab 150 in the peninsula region 140, the position of deploying the first sub-chamber 120 and the second sub-chamber 130 may be tuned.

Meanwhile, FIG. 4 is a diagram illustrating a folding embodiment of the first sub-chamber 120 according to the present invention.

Referring to the drawing, the main chamber 110 may be folded in a roll shape, and the first sub-chamber 120 may be folded between the mounting tab 150 and the vehicle body 300.

Figure 5:
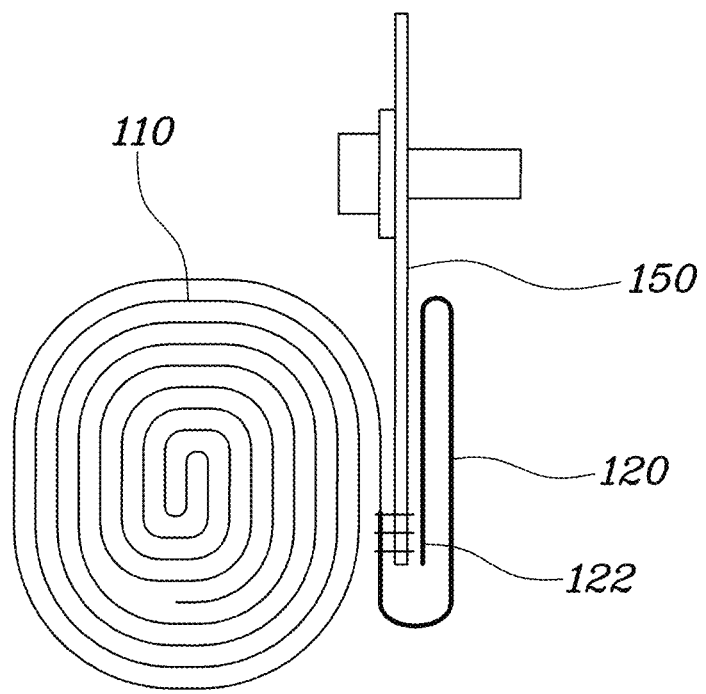

In addition, as another folding embodiment of the first sub-chamber 120, as shown in FIG. 5, a folding portion 122 on an end of the first sub-chamber 120 may be inwardly folded towards the mounting tab 150.

Figure 6:
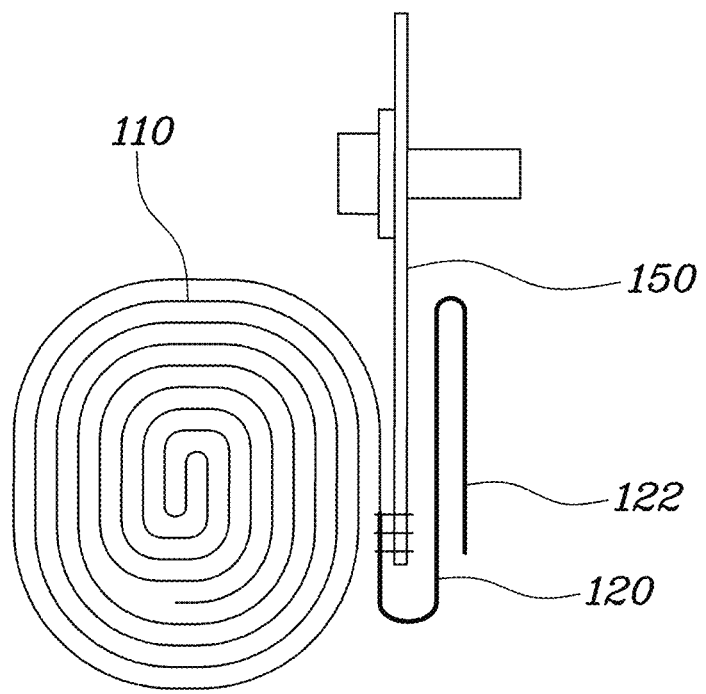

Furthermore, as a further folding embodiment of the first sub-chamber 120, as shown in FIG. 6, a folding portion 122 on an end of the first sub-chamber 120 may be outwardly folded towards the vehicle body 300.

To be more specific, one end of the first sub-chamber 120 connected to the main chamber 110 may be secured to the lower end of the mounting tab 150, and a portion of the first sub-chamber 120 connecting one end to the other end thereof may be configured to face the vehicle body 300.

Therefore, when the airbag is deployed, the first sub-chamber 120 is unfolded towards the vehicle body 300, so that the first sub-chamber 120 is deployed between the main chamber 110 and the vehicle body 300, and is deployed while pushing the main chamber 110 from the inner surface of the vehicle body 300 towards the center of the vehicle, thus preventing the main chamber 110 from interfering with the pillar trim 400.

Meanwhile, FIG. 8 is a diagram illustrating a folding embodiment of the second sub-chamber 130 according to the present invention.

Referring to the drawing, the main chamber 110 may be folded in a roll shape, and the second sub-chamber 130 may be folded over the main chamber 110 to surround the lower end of the main chamber 110.

Figure 9:
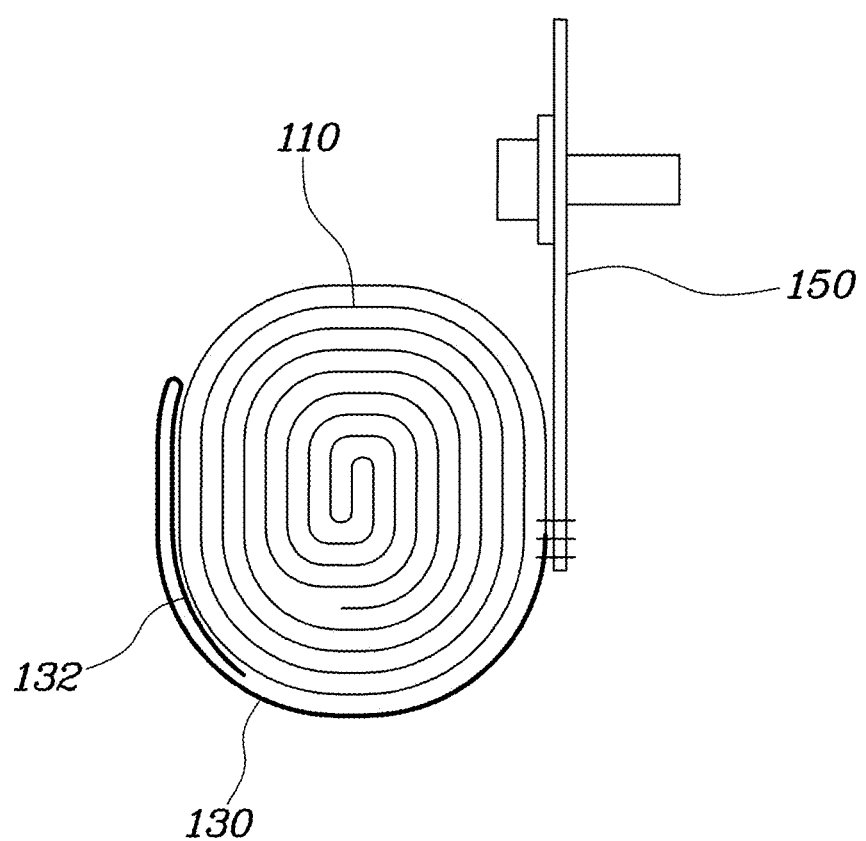

In addition, as another folding embodiment of the second sub-chamber 130, as shown in FIG. 9, a folding portion 132 on an end of the second sub-chamber 130 may be inwardly folded towards the main chamber 110.

Figure 10:
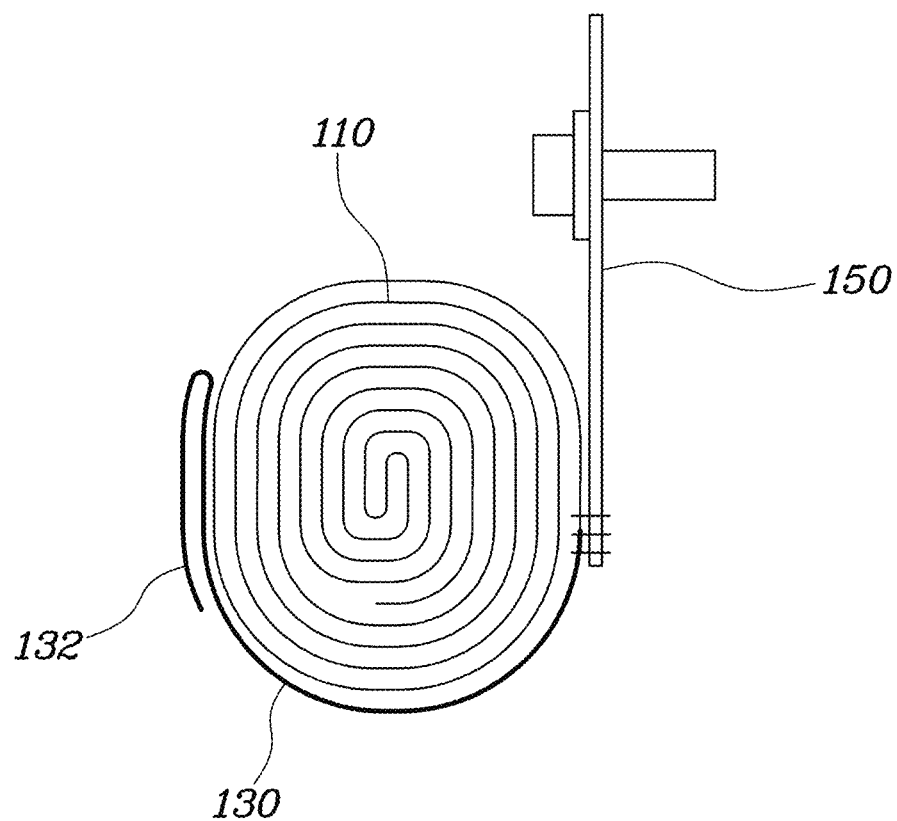

Furthermore, as a further folding embodiment of the second sub-chamber 130, as shown in FIG. 10, a folding portion 132 on an end of the second sub-chamber 130 may be outwardly folded towards the center of the vehicle.

To be more specific, one end of the second sub-chamber 130 connected to the main chamber 110 may be secured to the lower end of the mounting tab 150, and a middle portion of the second sub-chamber 130 connecting one end to the other end thereof may be configured to face the head lining 500 while surrounding the lower end of the main chamber 110.

Therefore, when the airbag is deployed, the second sub-chamber 130 is unfolded from the head lining 500 to the pillar trim 400, so that the second sub-chamber 130 is deployed beyond the end of the pillar trim 400 to the inboard side of the vehicle. This causes the main chamber 110 to be deployed between the second sub-chamber 130 and the head lining 500, thus reliably preventing the main chamber 110 from interfering with the pillar trim 400.

Hereinafter, the operation of deploying the curtain airbag according to the present invention will be described with reference to FIGS. 3 and 7.

When the collision signal of the vehicle is detected and the inflator 200 is exploded, gas supplied from the inflator 200 is introduced through the inlet 160a of the diffuser 160 into the airbag cushion 100.

Thus, gas introduced through the diffuser 160 flows into the first sub-chamber 120 and the front end of the main chamber 110, so that the first sub-chamber 120 is deployed and the main chamber 110 also starts to be deployed.

In this case, the first sub-chamber 120 is inflated above the pillar trim 400 of the B pillar while creating a predetermined volume, so that the first sub-chamber 120 rapidly pushes the airbag cushion 100 from the inner surface of the vehicle body 300 towards the center of the vehicle.

Subsequently, some of the gas introduced through the diffuser 160 flows into the second sub-chamber 130 and the rear end of the main chamber 110, so that the second sub-chamber 130 is also deployed.

At this time, the second sub-chamber 130 is inflated and deployed while being placed on the pillar trim 400 of the C pillar, thus filling a space above the pillar trim 400 and pushing the main chamber 110 towards the head lining 500.

Thus, the second sub-chamber 130 is deployed between the end of the pillar trim 400 of the C pillar and the main chamber 110, thus deploying the main chamber 110 downwards without interfering with the pillar trim 400 of the C pillar.

As described above, according to the present invention, the deployability of the airbag cushion 100 is improved through the first sub-chamber 120 and the second sub-chamber 130, and an existing ramp structure is not required to deploy the airbag cushion 100 while avoiding the pillar trim 400, thus reducing the cost of the curtain airbag module, and preventing the number of work processes for assembling the ramp from increasing.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A curtain airbag, comprising:
a main chamber of an airbag cushion secured to an upper end inside a vehicle body to be deployed toward a lower end thereof;
a first sub-chamber of the airbag cushion deployed above a pillar trim while pushing the vehicle body to move the main chamber towards a center of a vehicle; and
a second sub-chamber of the airbag cushion deployed between an end of the pillar trim and the main chamber, thus pushing the main chamber to prevent the main chamber from being caught by the end of the pillar trim;
wherein:
a diffuser is secured to an interior of the airbag cushion;
an inflator is connected to an inlet of the diffuser to introduce gas therein, and
an outlet of the diffuser is formed in each of the main chamber, the first sub-chamber, and the second sub-chamber to diffuse the gas introduced into the diffuser into each chamber;
wherein the inlet of the diffuser is connected to a first sub-outlet formed in the first sub-chamber and a first main-outlet formed in the main chamber to diffuse gas thereto, and the first main-outlet is connected to a second sub-outlet formed in the second sub-chamber and a second main-outlet formed in the main chamber to diffuse the gas thereto.

2. The curtain airbag of claim 1, wherein the first sub-chamber and the second sub-chamber are deployed prior to the main chamber.

3. The curtain airbag of claim 1, wherein the first sub-chamber is formed in a longitudinal direction of the main chamber, and has a shape of a passage where the inflator is connected to a first end of the first sub-chamber and a second end thereof is closed, and a middle portion of the first sub-chamber is formed to communicate with an edge of the main chamber, and
the second sub-chamber is formed in the longitudinal direction of the main chamber, and has a shape of a passage where a first end of the second sub-chamber communicates with the edge of the main chamber and a second end thereof is closed.

4. The curtain airbag of claim 3, wherein a peninsula region of a predetermined area which is not filled with gas is formed in at least one of between the second end of the first sub-chamber and the main chamber facing the second end, and between the second end of the second sub-chamber and the main chamber facing the second end,
a peninsula region around the first sub-chamber is formed such that edges thereof excluding one side are surrounded by an edge of the first sub-chamber and the edge of the main chamber, and
a peninsula region around the second sub-chamber is formed such that edges thereof excluding one side are surrounded by an edge of the second sub-chamber and the edge of the main chamber.

5. The curtain airbag of claim 1, wherein a first end of a mounting tab is secured to the vehicle body, and
a second end of the mounting tab is secured between the main chamber and the second sub-chamber.

6. The curtain airbag of claim 5, wherein the main chamber is folded in a roll shape, and
the second sub-chamber is folded over the main chamber to surround a lower end of the main chamber.

7. The curtain airbag of claim 6, wherein a folding portion on an end of the second sub-chamber is inwardly folded towards the main chamber.

8. The curtain airbag of claim 6, wherein a folding portion on an end of the second sub-chamber is outwardly folded towards the center of the vehicle.

9. The curtain airbag of claim 5, wherein the main chamber is folded in a roll shape, and
the first sub-chamber is folded between the mounting tab and the vehicle body.

10. The curtain airbag of claim 9, wherein a folding portion on an end of the first sub-chamber is inwardly folded towards the mounting tab.

11. The curtain airbag of claim 9, wherein a folding portion on an end of the first sub-chamber is outwardly folded towards the vehicle body.

* * * * *